United States Patent [19]
Barnes et al.

[11] Patent Number: 5,419,105
[45] Date of Patent: May 30, 1995

[54] STRUCTURE FOR AND METHOD OF BUNCHING LIMBS OF COTTON PLANTS

[75] Inventors: Ronny L. Barnes, O'Donnell; H. Wayne Mathews, Denison, both of Tex.

[73] Assignee: Gar-Bar- Corporation (Texas), O'Donnell, Tex.

[21] Appl. No.: 191,944

[22] Filed: Feb. 4, 1994

[51] Int. Cl.⁶ .................. A01D 46/08; A01D 75/14
[52] U.S. Cl. ................................. 56/10.2 F; 56/28
[58] Field of Search ............... 56/10.2 D, 10.2 F, 28, 56/36, 14.3, DIG. 15, DIG. 2; 172/5, 6

[56] References Cited

U.S. PATENT DOCUMENTS

| | | | |
|---|---|---|---|
| 5,185,990 | 2/1993 | Barnes et al. | 56/51 |
| 5,203,148 | 4/1993 | Schreiner et al. | 56/10.2 F |
| 5,307,611 | 5/1994 | Vardeman et al. | 56/10.2 F |
| 5,313,769 | 5/1994 | Barnes et al. | 172/6 X |

Primary Examiner—David J. Bagnell
Attorney, Agent, or Firm—Wendell Coffee

[57] ABSTRACT

A guidance system is provided for a cotton picker. The cotton pickers commercially on the market have lifting plates on each of the gathering heads to lift the lower limbs of the cotton plant. To make the wands of the detection of the position of the row operate satisfactorily the limbs are bunched together by bunching plates above the lifting plates. The effective width of the bunching plates is adjustable by an adjustment plate on top of the bunching plate. The wands are straps of metal made from plate rather than rods, as generally used for crop detection purposes. The wands are mounted for pivoting about a shaft which extends from the bunching plate to the lifting plate.

16 Claims, 3 Drawing Sheets

STRUCTURE FOR AND METHOD OF BUNCHING LIMBS OF COTTON PLANTS

CROSS REFERENCE TO RELATED APPLICATION

This application is co-pending with U.S. patent application Ser. No. 08/014,806, issued on May 24, 1994, as U.S. Pat. No. 5,313,769, which was itself co-pending with U.S. patent application Ser. No. 07/814,767, filed Dec. 30, 1991, and issued on Feb. 16, 1993, as U.S. Pat. No. 5,185,990. The above applications have common ownership with this application.

BACKGROUND OF THE INVENTION (1) Field of the Invention

This invention relates to agriculture and more particularly to agricultural harvesting vehicles. Farmers are the ones having ordinary skill in this art.

(2) Description of the Related Art

As set out in the BARNES et al U.S. Pat. No. 5,121,799, it is desirable to have a vehicle which can be guided along a designated path. Normally the designated path by which the vehicle will be guided will be a row, which might either be a series of stalks as described in the BARNES et al U.S. Pat. No. 5,148,873, or it might be a furrow as shown in U.S. Pat. No. 5,121,799. The issued U.S. Pat. No. 5,185,990 identified above illustrates a Row Follower to follow the stalks.

An encoder is shown in U.S. Pat. No. 5,148,873 is used to measure the deviation of the Row Follower from the vehicle to indicate the corrections to be applied to the steering mechanism of the vehicle as more fully set out in U.S. Pat. No. 5,121,799.

The U.S. Pat. No. 5,313,764 describes an encoder housing commercially on sale at the time this application was filed to structurally mount the encoder and to protect it from rough handling and from moisture as well as dust and sand.

The U.S. Pat. No. 5,185,990 as well as the U.S. Pat. No. 5,313,769 are concerned with stripping cotton. In the process of stripping cotton all of the fruit (generally called bolls) on the stalk are stripped therefrom. Other harvesters, and more particularly cotton pickers, are widely used which harvest only cotton from open bolls by snagging the cotton on rotating spindles. In this process it is normal for the gathering head to include a lifting plate which, at least partially, lifts the limbs of the cotton stalk from a low position upon the ground to bring them into a position to be harvested by the spindles. However, care is normally taken with cotton pickers to only pick the open cotton and, as far as possible, to avoid damage or to prevent the removal of the unopen bolls from the stalk.

SUMMARY OF THE INVENTION (1) Progressive Contribution to the Art

This invention discloses a guidance system for guiding a cotton picker to follow the rows of cotton.

According to this invention it is desirable to further collect or to position the limbs of the cotton into a bunch. In this regard the cotton is bunched together or gathered together. As discussed in prior patent applications, it is desirable that a cotton stripper be guided with particular precision so that it is no more than a fraction on an inch from the desired path. In general, more leeway is permissible when picking the cotton and it is not so crucial to successful harvesting that the vehicle be guided with such precision. Normally, when the picker is being guided, it may be vary from the row as much as 1 inch. (2.5 cm)

(2) Objects of this Invention

An object of this invention is to guide a harvesting vehicle along a path.

Another object of this invention is to bunch the limbs of a cotton stalk together for effective picking of open cotton from the plant.

Further objects are to guide a cotton picker along a row of stalks and also to bunch the parts of each plant together to be able to guide the vehicle along the row.

Further objects are to achieve the above with devices that are sturdy, compact, durable, lightweight, simple, safe, efficient, versatile, ecologically compatible, energy conserving, and reliable, yet inexpensive and easy to manufacture, install, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

Figure 1:
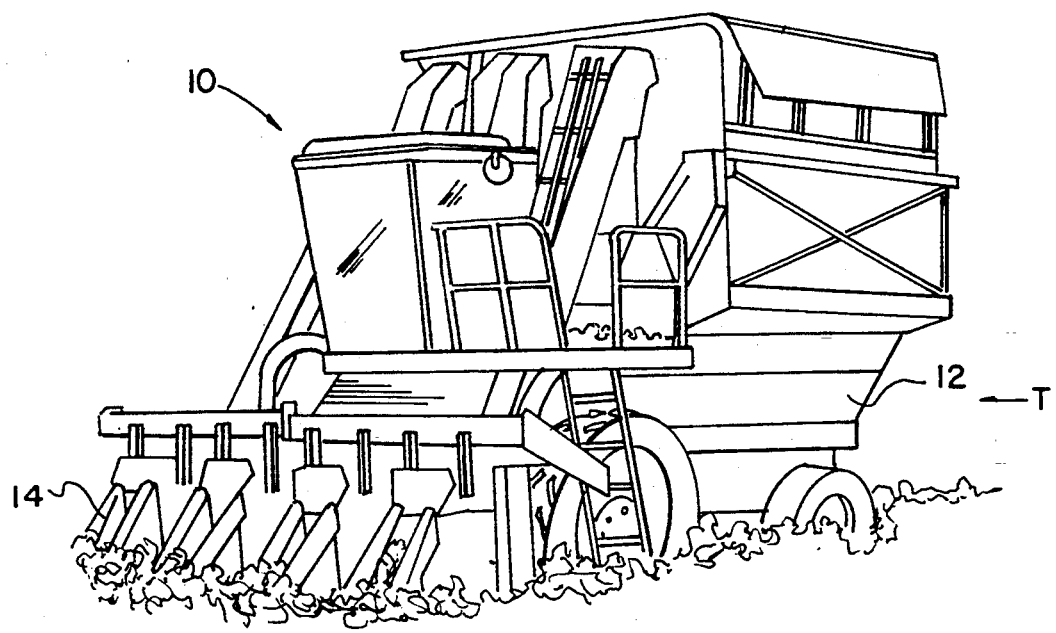
FIG. 1 is a perspective view of a cotton picker in a field of cotton.
Figure 2:
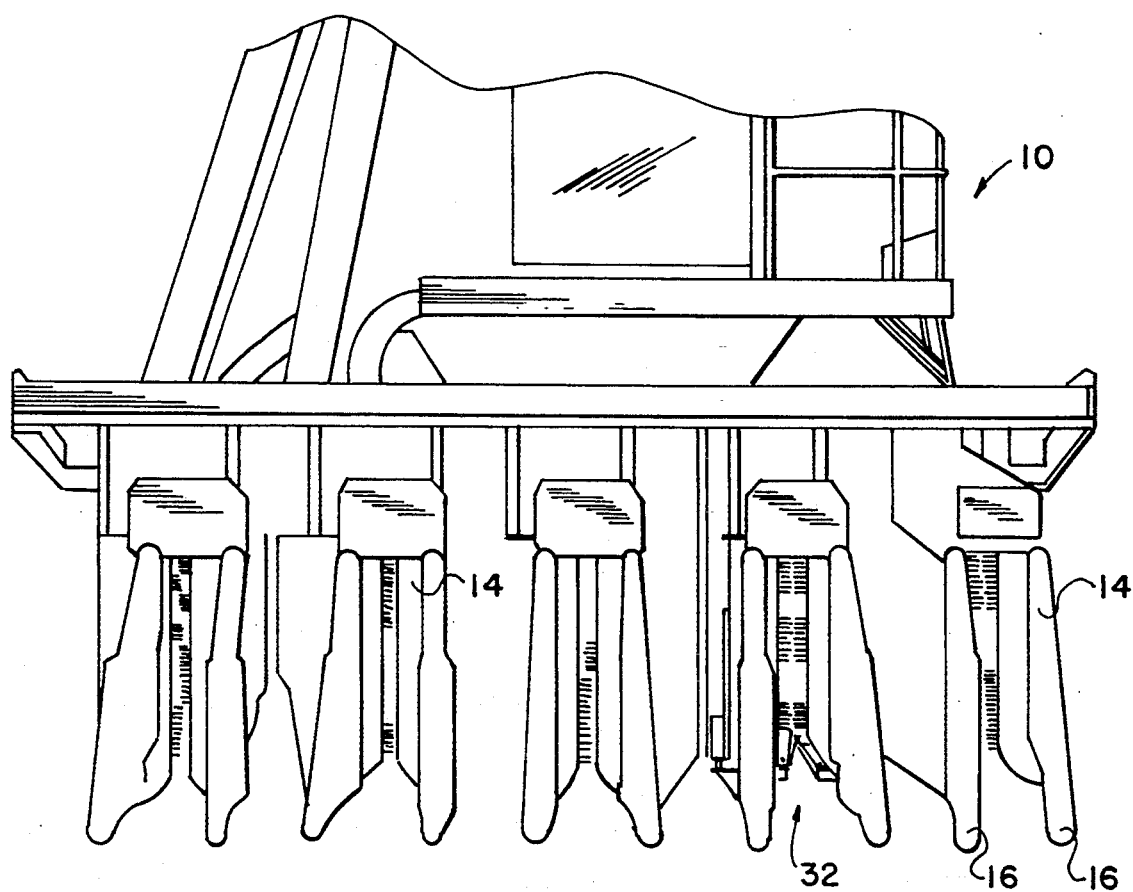
FIG. 2 is a front view of the harvester with guiding elements attached to one gathering head.
Figure 3:
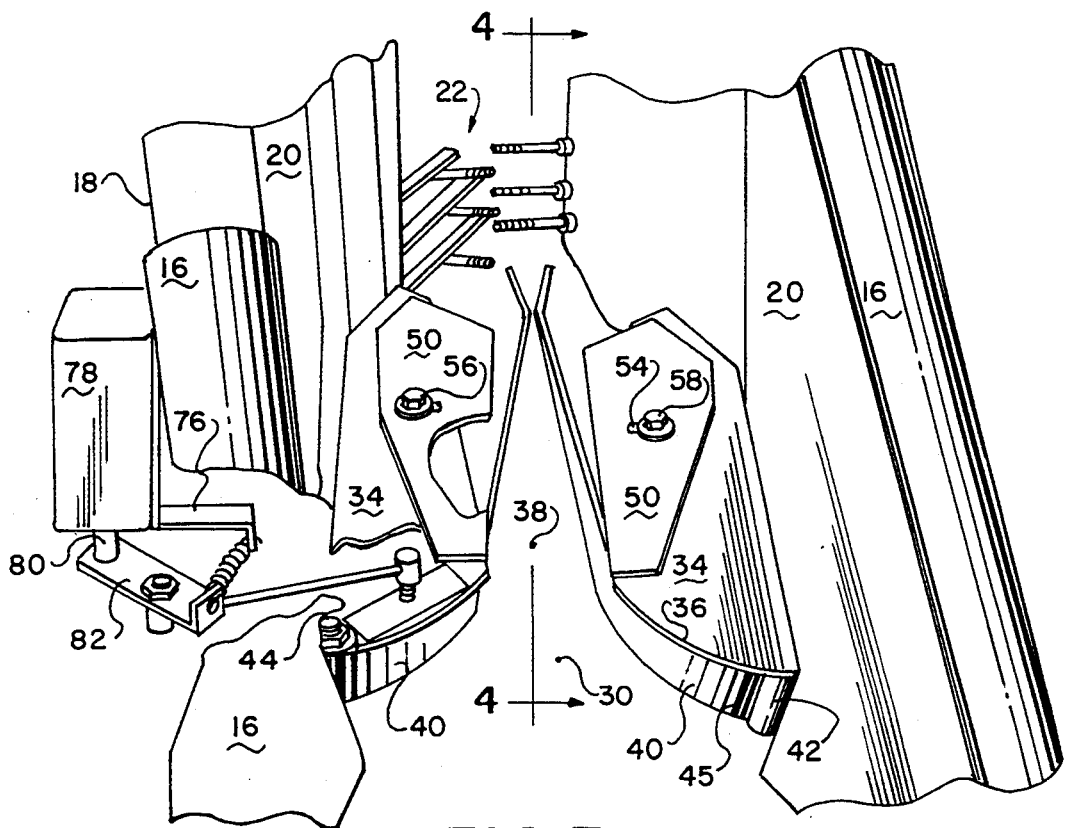
FIG. 3 is a front perspective view of the wands and other equipment shown in FIG. 2 partially broken away.
Figure 4:
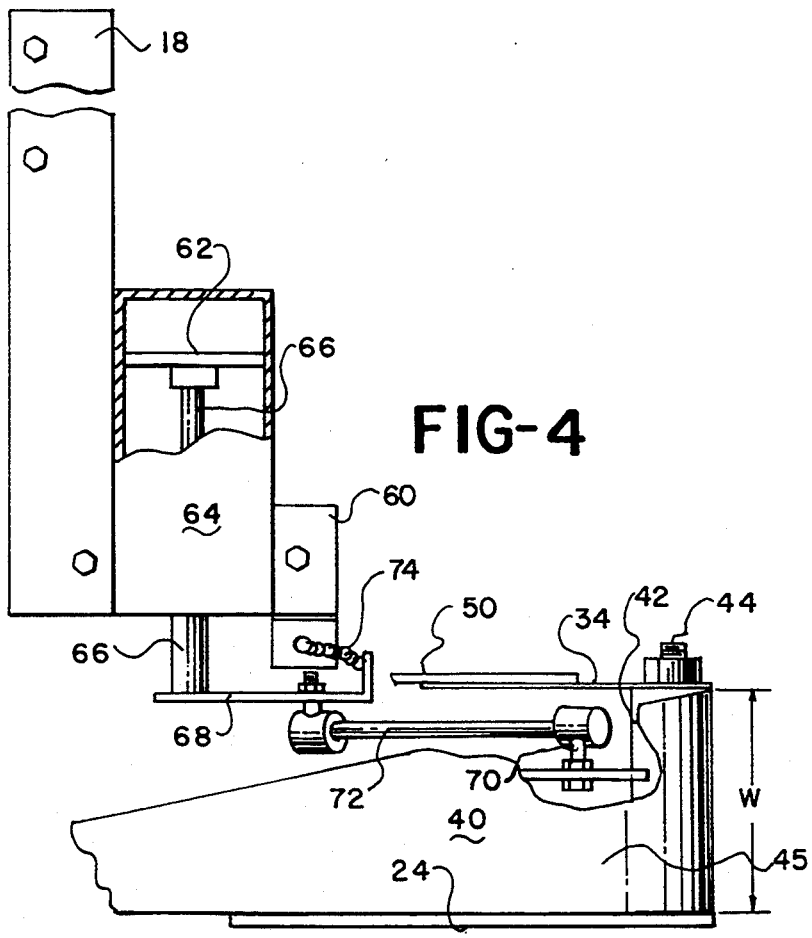
FIG. 4 is an elevational view taken along the line 4—4 of FIG. 3, with harvester parts omitted for clarity.

As an aid to correlating the terms of the claims to the exemplary drawing(s), the following catalog of elements and steps is provided:

10 harvester
12 agricultural vehicle
14 gathering heads
16 opposing fenders
18 outer face
20 inner face
22 harvesting unit
24 lifting plates
26 front
28 outward curve
30 throat
32 guiding head
34 bunching plate
36 convexly arcuate portion
38 throat
40 wand
42 cylindrical tube
44 shaft
45 front of the wand
46 back of the wand 48 extreme rear or back
50 adjustable plate
52 bolt
54 slot
56 threaded stud
58 nut
60 encoder bracket
62 encoder
64 encoder housing
66 encoder shaft
68 encoder arm
70 pintle
72 pitman
74 spring
76 dummy encoder bracket
78 dummy encoder housing
80 dummy shaft
82 dummy arm
"T" Travel
"W" width

DESCRIPTION OF THE PREFERRED EMBODIMENT

Referring to the drawing there may be seen harvester 10. Specifically, as illustrated, the harvester is in the form of a cotton picker.

The harvester is incorporated in agricultural vehicle 12 having a direction of travel as shown by arrow "T". Inasmuch as the vehicle has a direction of travel, various parts and individual elements upon the vehicle will have a front and a back.

The harvester has a series of gathering heads 14. Each of the gathering heads will have two opposing fenders 16. Each fender will have outer face 18 and inner face 20. Also, each of the gathering heads 14 will include harvesting unit 22 which harvests the crop from the plant. In this specific embodiment, the harvesting unit will be the spindles and their associated equipment for picking the cotton from the bolls upon the cotton plants.

Figure 5:
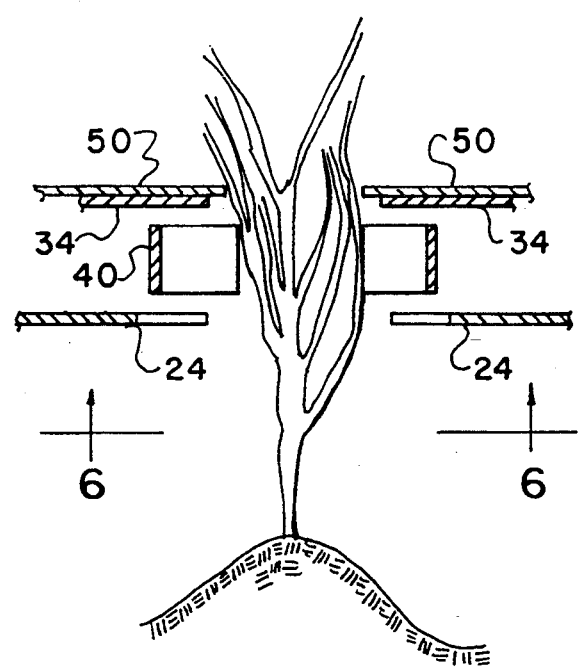
FIG. 5 is a sectional view taken substantially along the line 5—5 of FIG. 6.
Figure 6:
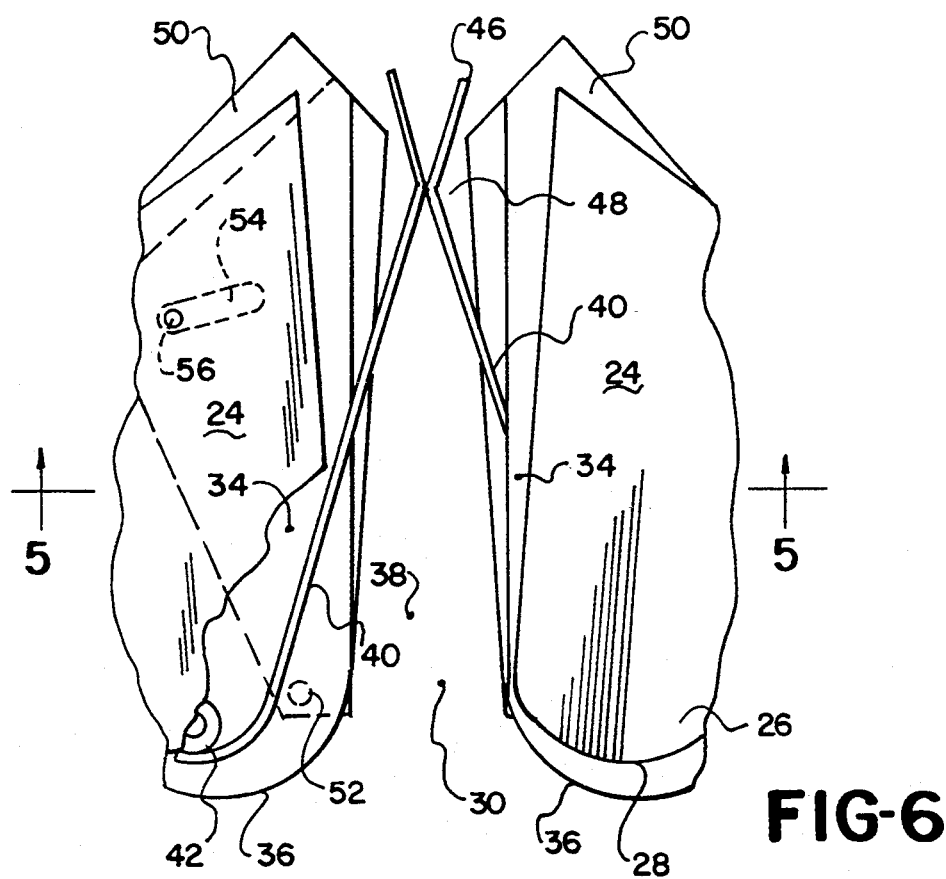
FIG. 6 is a bottom plan view of the wands and the other equipment on the guiding head partially broken away to show details of construction, taken substantially on line 6—6 of FIG. 5.

Because the cotton plant is normally a bushy plant having a main stalk with limbs branching away from it, it is desirable to lift the limbs from close to the ground. Often the cotton limbs will be close to the ground and for mechanical reasons it is not desirable to run much of the mechanisms along the ground because of the excessive dust and also occasionally if the ground would be irregular and sometimes it would get dirt into the mechanism which would be highly undesirable. Therefore lifting plates 24 are placed upon the inner face 20 of each of the fenders of each of the gathering heads (FIGS. 5 and 6). Each of the lifting plates will be horizontal and extend between the fenders of a gathering head. Front 26 of the lifting plates will be convexly arcuate, i.e., the outline will have outward curve 28 which is arcuate and convex. The two opposing plates, one on each of the fenders 16, will form throat 30 with a width of about four inches immediately behind the outwardly curved or convexly arcuate portions. The lifting plates 24 will be closer to the ground than the harvesting unit 22.

Those with ordinary skill in the art will understand that the structure described to this point is old and well known in the art. Also the operation and function of all the parts described to this point will be well understood by those having skill in the art.

One of the gathering heads is designated as guiding head 32. This guiding head is modified by placing additional equipment on it whereby the entire agricultural vehicle 12 may be accurately guided along the rows of cotton so that each of the gathering heads 14 will be in proper relationship to one of the rows of cotton.

Bunching plate 34 is attached on the inner face 20 of each of the fenders 16 of the guiding head 32. The two bunching plates will form, at least a portion of bunching means for bunching the limbs of each of the cotton plants toward the main stalk. Each of the bunching plates will be horizontal, will extend between the fenders, and will have convexly arcuate portion 36 which will form throat 38 with a width of about two inches. The bunching plates will be spaced above the lifter plates, which is to say that each bunching plate 34 will be spaced above the lifting plate 24 mounted upon the fender 16. Also it will be noted that the convexly arcuate portion 36 matches the outwardly curved portions 28 of the lifting plates. The throat 38 matches the throat 30 except for width. As may be seen the throat 38 is narrower than the throat 30 and the throat 30 is narrower than the distance between the fenders 16.

Wand 40 is mounted between the bunching plate 34 and the lifting plate 24 on each of the fenders 16 of the guiding head 32. From the drawings and from the above description, it may be seen that the lifting plates 24 are below the wand 40 and also below bunching plates 34. Also, the wand 40 is above the lifting plates 24 and is below the bunching plates 34. Further, the bunching plates 34 is above the wand 40 and also above the lifting plates 24. The wand is constructed of a plate of metal. Cylindrical tube 42 is attached to the front of said wand. The axis of the tube will be vertical. Shaft 44 extends through the lifting plate and through the cylinder 42 and the bunching plate 34, sometimes called a gathering plate. It may be seen by the cylindrical tubes and shaft form a pivot by which the wands are pivoted to the bunching plate 34 and the lifting plate 24.

Each of said wands has a width "W" adjacent to the cylinder 42. The width of the wand at the front of the wand 45 is equal to the length of the cylinder. At the back of the wand the width is reduced and the width of the wand at the back of the wand 46 is less than the length of the cylinder.

The front portion 45 of the wand will be curved outward or be convexly arcuate-matching the curve 28 in the lifting plate 24 and the convexly arcuate portion 36 of the bunching plate 34.

Near extreme rear or back of each wand, each of the wands are sharply bent at 48 away from the opposing wand. If the wands are not sharply bent away, at certain times in operation one wand may be extended far past the center area or media between the fenders. In this case the tip of the further extended wand tends to contact the opposing wand and lock into place in a unique or distorted position. However, by angling the extreme rear of each wand away prevents this occurrence.

In cotton fields having plants of different sizes, it is sometimes desirable that the effective distance between the bunching plates 34 be reduced. To achieve this end, adjustable plate 50 is placed on top of each of the gathering or plates 34. Bolt 52 extending through a hole in the adjusting plate and the bunching plate at the throat 38 provides that the adjusting plate can be pivoted to the bunching plate. To the rear of the placement of the bolt the adjusting plate will have an arcuate slot 54. The bolt will form the center of the arc of the slot 54. Threaded stud 56 extends upward from the bunching plate through said slot therefore by tightening nut 58 on the threaded stud the adjusted plate can be clamped in a fixed position to the gathering plate according to the preference of the operator of the harvester 10.

Encoder bracket 60 is attached on the outer face 18 of one of the fenders 16 of the guiding head 32. Encoder 62 is encased within encoder housing 64. The encoder housing is attached-to said bracket as by welding. Encoder shaft 66 extends from the encoder to the exterior of the encoder housing 64. Encoder arm 68 is attached to the encoder shaft 66 and extends radially therefrom. Conveniently the arm is attached to the shaft by attaching it toga sleeve which is telescoped over the end of the shaft.

Pintle 70 extends vertically upward from the wand 40 attached to the inner face 20 of the fender 16 to which the encoder housing is attached. Pitman 72 pivotally connects the wand pintle 70 to the encoder arm 68. By this pitman connection the movement of the wand is transmitted to the encoder arm. It will be understood that the wand and the encoder together form a portion of a means for measuring the distance of the bunched limbs of the cotton stalk from the fender unit. Also in the process, changes in the distance are detected and the encoder particularly translates the changes into electrical signals which can be readily transmitted to guidance systems which are well known and commercially on the market to guide the vehicle responsive to the electrical signals.

Tension spring 74 extends from the encoder arm 68 to the outer face 18 of the fender. Therefore the spring biases the arm through the connection of pitman 72. The wand 40 is biased away from the fender and toward the opposing wand.

On the opposing fender to which the encoder bracket is attached, dummy encoder bracket 76 is attached to the opposing fender 16. Dummy encoder housing 78 is attached to the bracket and dummy shaft 80 extends from the dummy housing 78. Likewise, dummy arm 82 is attached to the dummy shaft. By a similar pintle, pitman, and spring the opposing wand is biased toward the wand connected to the encoder 62°

In operation the limbs of each cotton plant are bunched toward its main stalk by the bunching plates 34 and the adjustable plates 50 thereon. The distance from the bunched limbs from one of the fenders 16 is measured as described. On this measurement and the detection of changes in this measurement the agricultural vehicle 12 is guided along the rows of cotton plants.

The embodiment shown and described above is only exemplary. We do not claim to have invented all the parts, elements or steps described. Various modifications can be made in the construction, material, arrangement, and operation, and still be within the scope of our invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. In a harvester for gathering agricultural product from a row of bushy plants, each plant having a main stalk and limbs extending therefrom, and the harvester including a) an agricultural vehicle having a direction of travel, whereby equipment on the vehicle has a front and back,
b) a series of gathering heads mounted on the vehicle,
c) two opposing fenders having an inner face and an outer face on each gathering head for gathering the plants in a row to
d) a harvester unit on each gathering head for harvesting a crop from the plants, and
e) a lifter plate on the inner face of each fender of the gathering head,
f) each lifter plate being
   i) horizontal,
   ii) extending between the fenders,
   iii) convexly arcuate at the front to form
   iv) a throat, and
   v) closer to the ground than the harvester unit;

the improved structure in combination with the above comprising:

g) at least one of the gathering heads designated as a guiding head, having
h) a bunching plate on the inner face of each of the fenders of the guiding head,
j) the bunching plates forming at least a portion of a bunching means for bunching the limbs of each of the plants toward a main stalk,
k) each bunching plate being
   i) horizontal,
   ii) extending between the fenders,
   iii) convexly arcuate at the front to form
   iv) a throat, and
   v) spaced above said lifter plate mounted on said fender.

2. The structure as defined in claim 1 wherein said harvester is a cotton harvester and said harvesting unit is a spindle type cotton picker.

3. The structure as defined in claim 1 further comprising:.
l) an adjustable plate on top of each of said bunching plates,
m) said adjustable plate pivotally connected to the bunching plate by
n) a pivot at the throat,
o) a slot in said adjustment plate, and
p) a threaded stud extending upward from the gathering plate through said slot so that the position of the adjustable plate can be fixed by tightening a nut on the threaded stud to clamp the adjustable plate to the gathering plate.

4. The structure as defined in claim 1 further comprising:
l) a wand having a front between the bunching plate and lifter plate on each fender unit of the guiding head,
m) the front of the wand pivoted to the plates about a vertical axis at the front of both plates,
n) bias means on the guiding head for biasing each of the wands toward the opposing wand, and
o) an encoder attached to one of the fender units of the guiding head and connected to one of the wands, whereby relative movement between the gathering head and the row of plants is detected, and the detected relative movement is translated into transmittable signals whereby the vehicle is guided along the row of plants.

5. The structure as defined in claim 4 further comprising:

p) a bracket on the outer face of one of the fenders of the guiding head,
q) an encoder housing encasing said encoder,
r) said encoder housing attached to said bracket,
s) said encoder having an encoder shaft extending from the encoder housing,
t) an encoder arm rigidly attached to the shaft and extending radially outwardly therefrom,
u) a tension spring extending from the encoder arm to the outer face of the fender,
v) a pintle extending vertically upward from the wand on the fender carrying the encoder bracket, and
w) a pitman pivotally connected to the wand pintle and to the encoder arm whereby movement of the wand is transmitted to the encoder arm and whereby the tension spring biases the wand away from the fender to which it is pivoted.

6. The structure as defined in claim 5 further comprising:
x) a dummy bracket on the outer face of the other of the fenders of the guiding head,
y) a dummy encoder housing attached to the dummy bracket having a dummy shaft extend from the dummy housing with a dummy arm attached to the dummy shaft, and a dummy tension spring extending from the dummy arm to the outer face,
z) a dummy pintle extend upward from the wand on the fender carrying the dummy bracket, and
aa) dummy pitman connecting the dummy pintle to the dummy arm.

7. The structure as defined in claim 4 wherein
p) said wand is constructed of a plate of metal,
q) a cylindrical tube attached to the front of said wand,
r) a shaft extending through the lifting plate, said cylinder, and the bunching plate thereby pivoting the wand to the lifting plate as described above.

8. The structure as defined in claim 7 wherein each of the wands is bent away from the opposite wand at the back of the wand.

9. The structure as defined in claim 7 further comprising:
s) said wand having a width adjacent to the cylinder equal to the length of said cylinder,
t) the wand having a width at the back portion of the wand less than the length of the cylinder.

10. The structure as defined in claim 7 further comprising:
s) the portion of the wand adjacent to the cylinder being the front portion of the wand,
t) the front portion of the wand convexly arcuate matching the arcuate front of the lifting plate and the bunching plate.

11. In a cotton harvester for gathering cotton from a row of cotton plants, each plant having a main stalk and limbs extending therefrom, the harvester including:
a) an agricultural vehicle having a direction of travel, whereby the equipment on the vehicle has a front and back,
b) a series of gathering heads mounted on the vehicle,
c) two opposing fenders having an inner face and an outer face on each gathering head for gathering the plants in a row to
d) a spindle type cotton picker on each gathering head for harvesting cotton from the plants, and
e) a lifter plate on the inner face of each fender of the guiding plate,
f) each lifter plate being
  i) horizontal,
  ii) extending between the fenders,
  iii) convexly arcuate at the front to form
  iv) a throat having a width of about three inches, and
  v) closer to the ground than the harvester unit; the improved structure in combination with the above comprising:
g) at least one of the gathering heads designated as a guiding head,
h) a bunching plate on the inner face of each of the fenders of the guiding head,
j) the bunching plate forming at least a portion of a bunching means for bunching the limbs of each of the plants toward a main stalk,
k) each bunching plate being
  i) horizontal,
  ii) extending between the fenders,
  iii) convexly arcuate at the front to form
  iv) a throat having a width of about 1.5 inches, and
  v) spaced above said lifter plate mounted on said fender,
l) an adjustable plate on top of each of said bunching plates,
m) said adjustable plate pivotally connected to the bunching plate by
n) a pivot at the throat,
o) a slot in said adjustment plate, and
p) a threaded stud extending upward from the gathering plate through said slot so that the position of the adjustable plate can be adjusted to provide a throat between the adjustable plates of less than 1.5 inches by tightening a nut on the threaded stud to clamp the adjustable plate to the gathering plate,
q) a wand having a front between the bunching plate and lifter plate on each fender unit of the guiding head,
r) said wand is constructed of a plate of metal,
s) a cylindrical tube attached to the front of said wand,
t) a shaft extending through the front of the lifting plate, said cylinder, and the front of the bunching plate thereby pivoting the wand to the lifting plate,
u) each of the wands bent away from the opposite wand at the back thereof,
v) said wand having a width adjacent to the cylinder equal to the length of said cylinder,
w) the wand having a width at the back portion of the wand less than the length of the cylinder,
x) the portion of the wand adjacent to the cylinder convexly arcuate matching the arcuate front of the lifting plate and gathering plate,
y) a bracket on the outer face of one of the fenders of the guiding head,
z) an encoder housing encasing
aa) an encoder
bb) said encoder housing attached to said bracket,
cc) said encoder having an encoder shaft extending from the encoder housing,
dd) an encoder arm rigidly attached to the shaft and extending radially outwardly therefrom,
ee) a tension spring extending from the encoder arm to the outer face,
ff) a pintle extending upward from the wand on the fender carrying the encoder bracket, and
gg) a pitman connected to the wand pintle and to the encoder arm whereby movement of the wand is transmitted to the encoder arm and whereby the tension spring biases the wand away from the fender to which it is pivoted.

12. The structure as defined in claim 11 further comprising:
   hh) a dummy bracket on the outer face of the other of the fenders of the guiding head,
   jj) a dummy encoder housing attached to the dummy bracket having a dummy shaft extend from the dummy housing with a dummy arm attached to the dummy shaft, and a dummy tension spring extending from the dummy arm to the outer face,
   kk) a dummy pintle extend upward from the wand on the fender carrying the dummy bracket, and
   ll) dummy pitman connecting the dummy pintle to the dummy arm.

13. A process for picking cotton from a row of cotton plants with a harvester including
   a) an agricultural vehicle having a direction of travel, whereby equipment on the vehicle has a front and back,
   b) a series of gathering heads mounted on the vehicle,
   c) two opposing fenders having an inner face and an outer face on each gathering head for gathering the plants in a row to
   d) a harvester unit on each gathering head for harvesting a crop from the plants, and
   e) a lifter plate on the inner face of each fender of the gathering head,
   f) each lifter plate being
      i) horizontal,
      ii) extending between the fenders,
      iii) convexly arcuate at the front to form
      iv) a throat, and
      v) closer to the ground than the harvester unit;
   the improved method comprising the following steps:
      g) bunching limbs of each of the cotton plants toward its main stalk closer to the main stalk than they may be bunched by said fenders,
      h) below where the limbs are bunched, measuring the distance of the bunched limbs from one of the fender units,
      j) detecting changes in the measured distance,
      k) translating the changes into electrical signals, and
      l) guiding the vehicle responsive to said electrical signals.

14. The process as defined in claim 13 further comprising:
   m) lifting limbs of each cotton plant below where the distance of the bunched limbs is measured.

15. The process as defined in claim 13 further comprising:
   m) adjusting the amount the limbs are bunched.

16. The process as defined in claim 13 further comprising:
   m) adjusting the amount the limbs are bunched, and
   n) lifting limbs of each cotton plant below where the distance of the bunched limbs is measured.

* * * * *